Patented Nov. 4, 1924.

1,513,865

UNITED STATES PATENT OFFICE.

BERNARD SEMENZA, OF NEW YORK, N. Y., ASSIGNOR OF FORTY PER CENT TO PATRICK WELCH, OF NEW YORK, N. Y.

RED-LEAD PAINT.

No Drawing.   Application filed December 12, 1923.   Serial No. 680,259.

*To all whom it may concern:*

Be it known that I, BERNARD SEMENZA, a citizen of the United States, and a resident of New York, in the county of New York and State of New York, have invented certain new and useful Improvements in Red-Lead Paints, of which the following is a specification.

This invention relates to red paints and is more particularly directed to paint formed of red lead.

It is well known in the art of paint manufacture that red lead paints cannot be manufactured and put up in cans and sold under the well-known caption "Ready made paints" since the red lead paint will become hard and useless after having been mixed and permitted to stand, whether the paint is protected from the atmosphere or not. Therefore it has been the custom to procure the red lead, turpentine and linseed oil and mix only so much as may be required for each day. Any surplus red paint that would be permitted to stand over night would be unfit for use the next day.

It is an object of my invention to provide a red lead paint which may be put up in cans and stored for any length of time and sold as "Ready mixed paints" and which will not become hardened after a length of time.

It is a further object of my invention to add to the red lead paint as normally manufactured, an ingredient such as plaster of Paris which will not effect the qualities of the red lead but which will prevent livering of the same if the mixed paint is stored.

In carrying out my invention I prepare initially a binder by thoroughly mixing together equal quantities of linseed oil and turpentine. An intimate mixture of red lead and plaster of Paris is prepared, both in powdered form, in the relative proportions by weight of 3 to 1. To this is added the equal part mixture of the linseed oil and turpentine and the whole is agitated until the ingredients are thoroughly incorporated. A sufficient mixture composed of linseed oil and turpentine is employed with 3 pounds of red lead and a pound of plaster which will be of the proper consistency for applying the paint. One-half gill of japan dryer may be added during the mixing or the same may be added whenever desired, it being understood that the dryer has no effect upon the paint whatever, even though the dryer be added before the mixture is placed in cans for storage and commerce. The red lead and plaster must be formed in an intimate mixture in the dry state, otherwise the red lead will form a body with the oil alone and the plaster of Paris would loose its efficacy in the paint. The plaster of Paris should be passed through a screen of very fine mesh before being incorporated with the red lead.

A slightly inferior grade of red lead paint may be made by employing rosin oil which consists of rosin dissolved in benzine. This is thoroughly mixed with red lead and plaster of Paris to which is added linseed oil cut by 50% of turpentine, it being understood that the turpentine and linseed oil must be thoroughly mixed before placing in the first group of ingredients. I employ approximately 6½ pounds of rosin oil with each 3 pounds of red lead.

While I have stated that I employ 3 pounds of red lead to 1 pound of plaster, variations in the quantities of the red lead and plaster may be employed without seriously affecting the quality of the paint provided that the proportion of plaster is not too great relative to the amount of red lead. Such variations may include the approximate proportions of 50% of plaster by weight to 50% of red lead.

What I claim is:

1. A paint comprising in the proportions of 3 pounds of red lead, 1 pound of plaster of Paris, linseed oil, and turpentine.

2. A paint comprising in the proportions of 3 pounds of red lead, 1 pound of plaster of Paris, and equal parts of linseed oil and turpentine.

3. A paint comprising in the proportions of 3 pounds of red lead, 1 pound of plaster of Paris, rosin dissolved in benzine, and sufficient linseed oil cut by 50% of turpentine to form a mixture of a consistency adapted for painting.

BERNARD SEMENZA.